United States Patent
Shepelev (10) Patent No.: US 10,620,759 B2
(45) Date of Patent: Apr. 14, 2020

(54) METHOD AND SYSTEM FOR SCANNING MATRIX ELECTRODE SUB-REGIONS

(71) Applicant: Synaptics Incorporated, San Jose, CA (US)

(72) Inventor: Petr Shepelev, Campbell, CA (US)

(73) Assignee: Synaptics Incorporated, San Jose, CA (US)

( * ) Notice: Subject to any disclaimer, the term of this patent is extended or adjusted under 35 U.S.C. 154(b) by 109 days.

(21) Appl. No.: 15/707,377

(22) Filed: Sep. 18, 2017

(65) Prior Publication Data

US 2019/0087030 A1 Mar. 21, 2019

(51) Int. Cl.
*G06F 3/044* (2006.01)
*G06F 3/041* (2006.01)

(52) U.S. Cl.
CPC .......... *G06F 3/044* (2013.01); *G06F 3/0412* (2013.01); *G06F 3/0414* (2013.01); *G06F 3/0416* (2013.01)

(58) Field of Classification Search
CPC .......... G06F 3/044; G06F 3/0412; G06F 3/41
See application file for complete search history.

(56) References Cited

U.S. PATENT DOCUMENTS

| | | | | |
|---|---|---|---|---|
| 2010/0060608 A1* | 3/2010 | Yousefpor | ............ | G06F 3/0418 345/174 |
| 2010/0292945 A1* | 11/2010 | Reynolds | ........... | G01R 27/2605 702/65 |
| 2011/0175671 A1* | 7/2011 | Reynolds | ................ | G06F 3/044 327/517 |
| 2012/0154324 A1* | 6/2012 | Wright | .................. | G06F 3/0416 345/174 |
| 2013/0100071 A1* | 4/2013 | Wright | .................. | G06F 1/3262 345/174 |
| 2013/0285973 A1* | 10/2013 | Elias | ....................... | G06F 3/044 345/174 |
| 2015/0261377 A1* | 9/2015 | Reynolds | .............. | G06F 3/0416 345/174 |
| 2015/0378479 A1* | 12/2015 | Hayashi | .................. | G06F 3/044 345/174 |
| 2017/0364184 A1* | 12/2017 | Weinerth | ................ | G06F 3/044 |

* cited by examiner

*Primary Examiner* — Olga V Merkoulova
(74) *Attorney, Agent, or Firm* — Ferguson Braswell Fraser Kubasta PC (57) ABSTRACT

A method of capacitive sensing may include performing, using the matrix electrode array, a transcapacitive scan to detect an input object in a sensing region of the input device. The method may further include determining, using the transcapacitive scan, positional information regarding a location of the input object in the sensing region. The method may further include determining, using the positional information, a sub-region of the matrix electrode array. The method may further include performing an absolute capacitive scan using the sub-region of the matrix electrode array. The method may further include determining, using the absolute capacitive scan, object information regarding the location of the input object in the sensing region.

20 Claims, 7 Drawing Sheets

METHOD AND SYSTEM FOR SCANNING MATRIX ELECTRODE SUB-REGIONS

FIELD

This disclosed technology generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Moreover, to obtain detailed information regarding an input object, absolute capacitive sensing techniques may be performed with respect to the input object. However, an absolute capacitive scan of an entire sensing region increases the input device processing requirements for analyzing absolute capacitive measurements as well as the electric power requirements for performing the absolute capacitive scan.

SUMMARY

In general, in one aspect, the disclosed technology relates to a processing system. The processing system includes a sensor module configured to perform, using a matrix electrode array, a transcapacitive scan to detect an input object in a sensing region of an input device. The sensor module is further configured to perform a absolute capacitive scan using a sub-region of the matrix electrode array. The processing system further includes a determination module configured to determine, using the transcapacitive scan, positional information regarding a location of the input object in the sensing region. The determination module is further configured to determine, using the positional information, the sub-region of the matrix electrode array. The determination module is further configured to determine, using the absolute capacitive scan, object information regarding the location of the input object in the sensing region.

In general, in one aspect, the disclosed technology relates to an input device that includes a matrix electrode array. The input device further includes a processing system operatively connected to the matrix electrode array. The processing system configured to perform, using the matrix electrode array, a transcapacitive scan to detect an input object in a sensing region of the input device. The processing system is further configured to determine, using the transcapacitive scan, positional information regarding a location of the input object in the sensing region. The processing system is further configured to determine, using the positional information, a sub-region of the matrix electrode array. The processing system is further configured to perform an absolute capacitive scan using the sub-region of the matrix electrode array. The processing system is further configured to determine, using the absolute capacitive scan, object information regarding the location of the input object in the sensing region.

In general, in one aspect, the disclosed technology relates to a method of capacitive sensing. The method includes performing, using the matrix electrode array, a transcapacitive scan to detect an input object in a sensing region of the input device. The method further includes determining, using the transcapacitive scan, positional information regarding a location of the input object in the sensing region. The method further includes determining, using the positional information, a sub-region of the matrix electrode array. The method further includes performing an absolute capacitive scan using the sub-region of the matrix electrode array. The method further includes determining, using the absolute capacitive scan, object information regarding the location of the input object in the sensing region.

Other aspects of the disclosed technology will be apparent from the following description and the appended claims.

DETAILED DESCRIPTION

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability. In particular, one or more embodiments of the disclosed technology are directed to an input device with a matrix electrode array. The matrix electrode array may dynamically adjust a size of an absolute capacitive scan to the location of one or more input objects in a sensing region. Specifically, a matrix electrode array may perform a transcapacitive scan to detect each input object location. The transcapacitive scan may use various proximity techniques that use transcapacitance to detect an input object within a sensing region. After the transcapacitive scan, the matrix electrode array may divide electrodes in the array into one or more sub-regions tailored to each input object. A sub-region may include a subset of receiver electrodes and/or transmitter electrodes among the matrix electrode array. In the sub-regions of the matrix electrode array, for example, the input device may obtain absolute capacitive measurements of a particular input object that tracks the position of an input object. Likewise, sub-regions may be used to obtain other object information, such as the type of input object, the size of the input object, etc.

Figure 1:
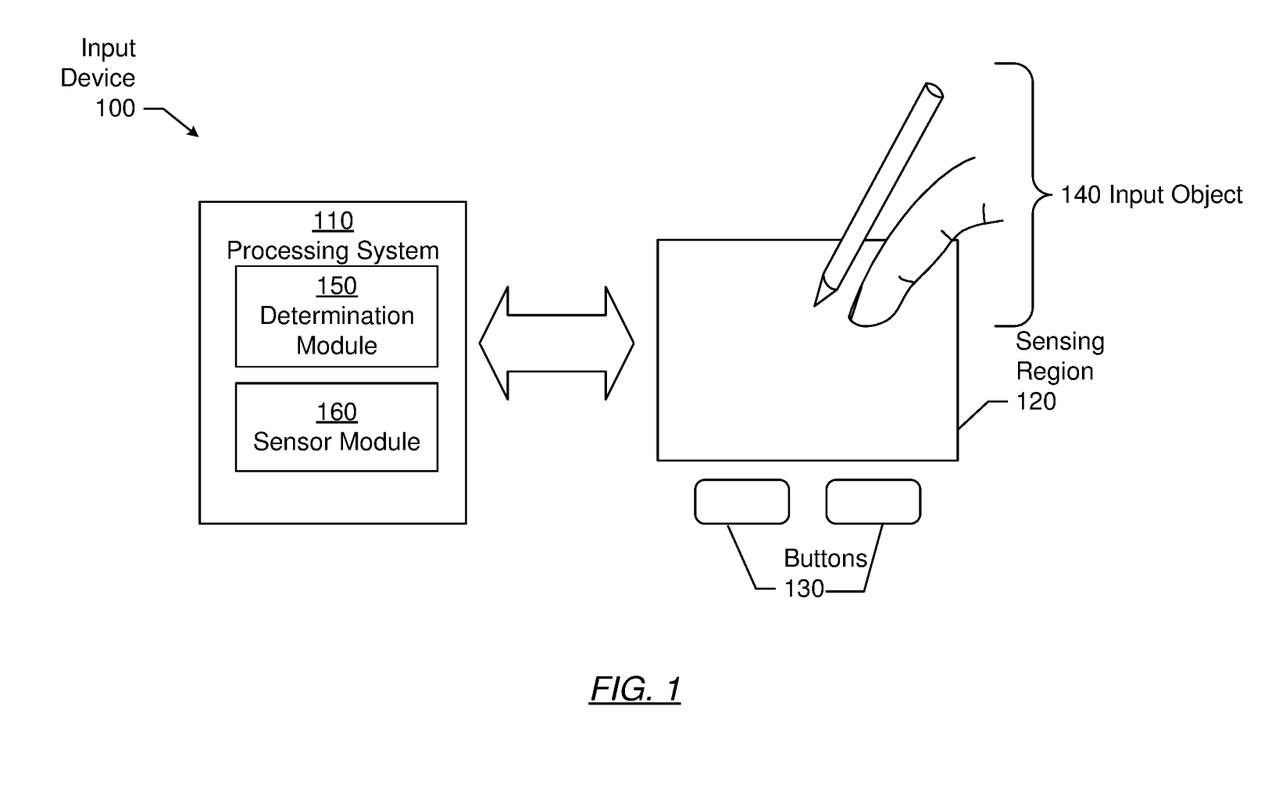
FIG. 1 shows a block diagram of an example system that includes an input device in accordance with one or more embodiments.

Turning now to the figures, FIG. 1 is a block diagram of an exemplary input device (100), in accordance with embodiments of this disclosed technology The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Example communication protocols include I2C, SPI, PS/2, Universal Serial Bus (USB), Bluetooth®, RF, and IrDA protocols.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects in the sensing region may change over the course of one or more gestures. To avoid unnecessarily complicating the description, the singular form of input object is used and refers to all of the above variations.

The sensing region (120) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g., a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) may include one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage, and in various embodiments, the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter signals may be electrically applied to transmitter electrodes, where the transmitter signals may be relative to a reference voltage (e.g., system ground). Receiver sensor electrodes may be held substantially constant relative to the reference voltage to facilitate receipt of resulting signals. The reference voltage may be a substantially constant voltage and, in various embodiments, the reference voltage may be system ground. The transmitter electrodes may be electrically driven with respect to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUI) actions such as cursor movement, selection, menu navigation, haptic actuation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the information provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active area of a display screen. For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosed technology. For example, various components may be combined to create a single component. As another example, the functionality performed by a single component may be performed by two or more components. Accordingly, for at least the above-recited reasons, embodiments of the disclosed technology should not be considered limited to the specific arrangements of components and/or elements shown in FIG. 1.

Figure 2:
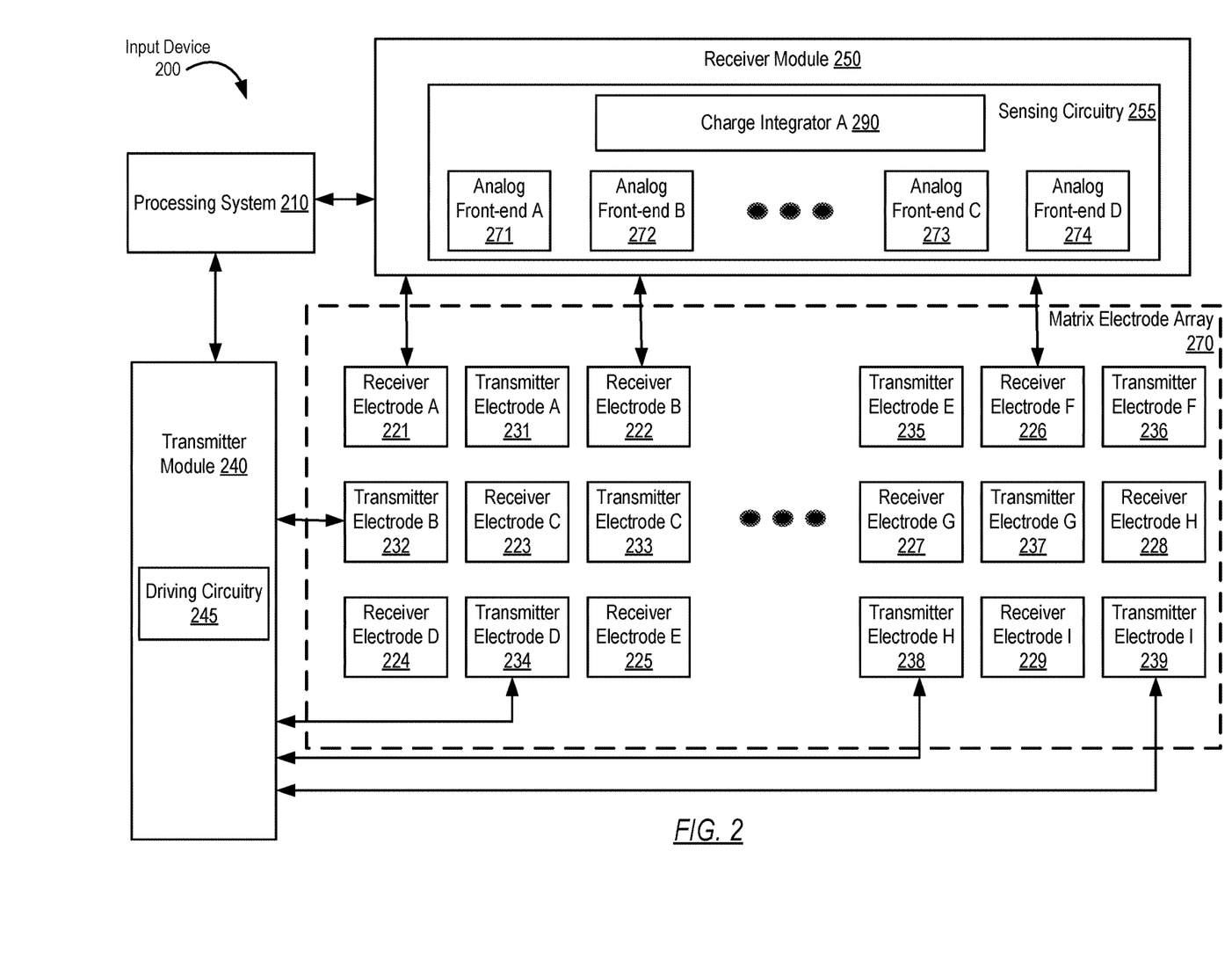
FIG. 2 shows a schematic view of an input device in accordance with one or more embodiments.

Turning to FIG. 2, FIG. 2 shows a schematic view of an input device (200) in accordance with one or more embodiments. As shown in FIG. 2, the input device (200) may include a receiver module (250), a transmitter module (240), and a processing system (210). The processing system (210) may be similar to processing system (110) described in FIG. 1 and the accompanying description and/or the computing system (600) described in FIG. 6 and the accompanying description. The transmitter module (240) may include driving circuitry (245) that may be similar to transmitter circuitry described in FIG. 1 and the accompanying description. For example, driving circuitry (245) may include hardware and/or software that includes functionality to generate one or more sensing signals transmitted over one or more transmitter electrodes (e.g., transmitter electrode A (231), transmitter electrode B (232), transmitter electrode C (233), transmitter electrode D (234), transmitter electrode E (235), transmitter electrode F (236), transmitter electrode G (237), transmitter electrode H (238), transmitter electrode I (239)). The transmitter electrodes (231, 232, 233, 234, 235, 236, 237, 238, 239) may be similar to the transmitter electrodes described in FIG. 1 and the accompanying description. Likewise, various routing traces (not shown), such as gate lines and source lines, may couple driving circuitry (245) with the transmitter electrodes (231, 232, 233, 234, 235, 236, 237, 238, 239).

Moreover, the receiver module (250) may include sensing circuitry (255). For example, sensing circuitry (255) may include hardware and/or software that includes functionality to obtain one or more resulting signals from one or more receiver electrodes (e.g., receiver electrode A (221), receiver electrode B (222), receiver electrode C (223), receiver electrode D (224), receiver electrode E (225), receiver electrode F (226), receiver electrode G (227), receiver electrode H (228), receiver electrode I (229)) in response to one or more sensing signals transmitted over the transmitter electrodes (231, 232, 233, 234, 235, 236, 237, 238, 239). The sensing circuitry (255) may be similar to the receiver circuitry described in FIG. 1 and the accompanying description.

In particular, the sensing circuitry (255) may include various analog front-ends (e.g., analog front-end A (271), analog front-end B (272), analog front-end C (273), analog front-end D (274)), which may include various analog conditioning circuitry. For example, analog-front ends may include operational amplifiers, digital-signal processing components, charge collection mechanisms, filters, and various application-specific integrated circuits for detecting and analyzing resulting signals obtained from the receiver electrodes (221, 222, 223, 224, 225, 226, 227, 228, 229). Likewise, the receiver electrodes (221, 222, 223, 224, 225, 226, 227, 228, 229) may be similar to the receiver electrodes described in FIG. 1 and the accompanying description. Likewise, various routing traces (not shown) may couple sensing circuitry (255) with the receiver electrodes (221, 222, 223, 224, 225, 226, 227, 228, 229).

In one or more embodiments, the input device (200) includes a matrix electrode array (e.g., matrix electrode array (270)). For example, the matrix electrode array (270) may include the transmitter electrodes (231, 232, 233, 234, 235, 236, 237, 238, 239) and the receiver electrodes (221, 222, 223, 224, 225, 226, 227, 228, 229) disposed according to a predetermined shape, such as a square, rectangle, circle, regular and irregular shapes, and/or other geometric shapes. Within the matrix electrode array (270), receiver electrodes and transmitter electrodes may alternate in rows and/or columns to form a predetermined pattern, e.g., receiver electrode then transmitter electrode, two receiver electrodes then one transmitter electrode, etc.

In one or more embodiments, for example, transmitter electrodes and receiver electrodes are arranged in a checkerboard pattern similar to the electrode arrangement shown in FIG. 2. In a checkerboard pattern, an entire sensing region of the input device (200) may be covered by approximately half of connected AFEs used in a traditional absolute capacitive sensing mode on a matrix electrode array input device. For example, a transcapacitive scan of a matrix electrode array (270) may not use simpler and smaller hardware as the sensor circuitry (255) directed towards absolute capacitive sensing. In one or more embodiments, for example, driving circuitry and/or a multiplexor for transmitting sensing signals to the transmitter electrodes may be implemented outside of an application specific integrated circuit (ASIC) in an InCell implementation for an input device. As such, a checkerboard pattern may provide a transcapacitive scan that is two times larger in sensing region area than may be scanned by a traditional matrix electrode array input device. Using the same number of analog front-ends, a capacitive response from the matrix electrode array (270) may be obtained in two times fewer multiplexing steps, if a number of analog front-ends is less than a number of sensor electrodes in the matrix electrode array (270). If the same number of AFEs is available as the number of sensor electrodes, then electric power may be conserved by scanning an entire area of the matrix electrode array (270) with only half of the receiver electrodes enabled.

Continuing with FIG. 2, in one or more embodiments, transmitter electrodes and/or routing traces are configured based on various types analog front-ends. For example, in one type of analog front-end, the analog front-end may include and/or be coupled with a charge integrator. In another type of analog front-end, the analog front-end may be configured to operate using a current conveyor. Accordingly, an analog front-end may include an input terminal and a reference terminal. The input terminal may receive a resulting signal from a receiver electrode, while the reference terminal may be set to a DC voltage or a modulated voltage.

Moreover, various modes may be implemented with a particular analog front-end. In one mode, where a DC voltage is used at the reference terminal, sensing signals transmitted to transmitter electrodes may be modulated. Likewise, gate lines may be set to one or more DC voltage levels, while source lines may be set to one or more DC voltage levels or a high impedance (HiZ) level. In another mode, where a modulated signal is applied to the reference terminal, transmitter electrodes may be set at one or more DC voltage levels. As such, the gate lines may be guarded with a modulation signal with a similar waveform as the modulated signal applied to the reference terminal. The source lines may be similarly guarded in the manner as the gate lines or set to a HiZ level. The different modes of an analog front-end may be implemented with respect to transmitter electrodes for capacitive sensing as well as sensor electrodes used for display updating.

Continuing with FIG. 2A, the sensing circuitry (255) may include one or more charge integrators (e.g., charge integrator A (290)). In particular, a charge integrator may include hardware and/or software that includes functionality for transforming one or more resulting signals into a voltage output proportional a respective resulting signal. For example, a charge integrator may include an amplifier with an input terminal and a reference terminal that is configured in a similar manner as described above with respect to the input terminal and reference terminal of the analog front-end. Thus, charge integrator A (290) may include one or more amplifiers, various feedback capacitors, and other circuit components.

The sensing circuitry (255) may further include one or more current conveyors. For example, a current conveyor may include hardware and/or software for replicating a resulting signal and/or an approximation of a resulting signal. A current conveyor may also be configured according to one or more modes describes above with respect to the various types of analog front-ends.

Figure 3:
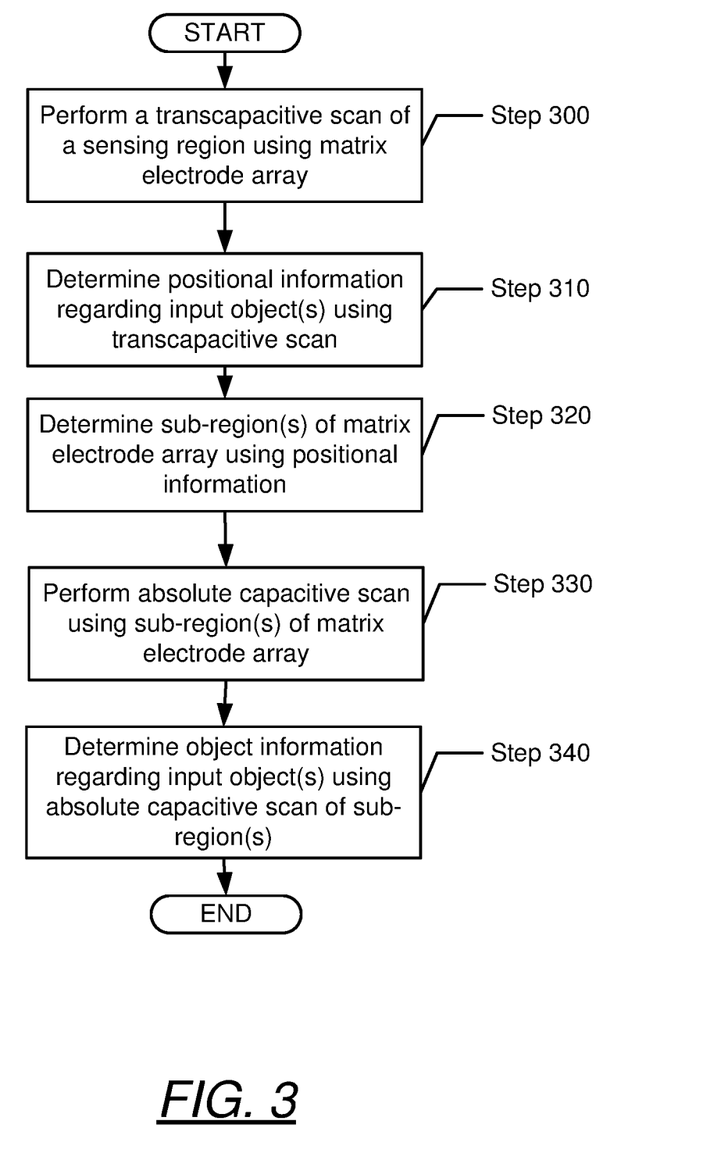
FIG. 3 shows a flowchart in accordance with one or more embodiments.

Turning to FIG. 3, FIG. 3 shows a flowchart in accordance with one or more embodiments. Specifically, FIG. 3 describes a method for performing capacitive sensing with sub-regions of an input device. The process shown in FIG. 3 may involve, for example, one or more components discussed above in reference to FIGS. 1 and 2 (e.g., processing system (110)). While the various steps in FIG. 3 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 300, a transcapacitive scan of a sensing region is performed using a matrix electrode array in accordance with one or more embodiments. For example, an input device may perform a transcapacitive scan may using each sensor electrode or a portion of the sensor electrodes in a matrix electrode array. Likewise, the transcapacitive scan may detect one or more input objects using mutual capacitive sensing along with transmitter electrodes and receiver electrodes as described in FIGS. 1 and 2 and the accompanying description.

In Step 310, positional information is determined using a transcapacitive scan regarding one or more input objects in accordance with one or more embodiments. Using the transcapacitive scan from Step 300, for example, positional information may be obtained for each input object in a sensing region of the input device. For example, the positional information may be similar to the positional information described in FIG. 1 and the accompanying description.

In Step 320, one or more sub-regions of a matrix electrode array are determined using positional information in accordance with one or more embodiments. In one or more embodiments, for example, a processing system determines which electrodes are proximate a particular input object in a sub-region of a matrix electrode array based on the positional information. For example, receiver electrodes and/or transmitter electrodes may correspond to various positional coordinates in a sensing region. For example, a processing system may select sensor electrodes within a matrix electrode array that match the location of an input object. Likewise, one or more pre-stored sub-region templates may be selected based on the center of an input object, e.g., location in the sensing region with the highest capacitive response. Where more than a single input object is located in a sensing region, the processing system may determine a single sub-region that encompasses each input object, or individual respective sub-regions for each input object. Furthermore, one or more input objects may be designated as an object of no interest, e.g., a palm of a user's hand. Accordingly, an input device may determine sub-regions only for objects of interest, e.g., individual fingers.

Likewise, a sub-region may be determined using an estimate of the location of an input object until an absolute capacitive scan is performed in Step 330 below. As such, the sensor electrodes in a sub-region may be updated by adding and/or removing sensor electrodes based on a changing location of an input object and/or increased precision regarding the location of the input object. Moreover, different types of input objects may correspond to different sizes of sub-regions with respect to the same positional information. For example, where a detected input object is a palm of a user's hand, a respective sub-region may include sensor electrodes proximate the edge of the palm and excludes sensor electrodes in proximate the center of the palm. For a finger, the respective sub-region may only include sensor electrodes near the tip of the finger.

In Step 330, an absolute capacitive scan is performed using one or more sub-regions of a matrix electrode array in accordance with one or more embodiments. For example, a processing system may obtain a capacitive image of a portion of the sensing region using a sub-region similar to the sub-regions described in Step 320 and the accompanying description. The capacitive image may include various absolute capacitive measurements that correspond to a change in a variable capacitance between an input object and the sensor electrodes.

In Step 340, object information regarding one or more input objects is determined using an absolute capacitive scan of one or more sub-regions in accordance with one or more embodiments. For example, object information may include positional information similar to the positional information described in FIG. 1 and the accompanying description. Object information may also include various characteristics of an input object, such as input object size and/or the type of input object, e.g., an index finger, a palm, a user's face, stylus, etc. As such, a processing system may compare values obtained from the absolute capacitive scan from Step 330 with templates and/or threshold values to determine the object information.

While FIG. 3 above and FIG. 4 below is described with respect to performance of a transcapacitive scan in order to obtain positional information for the sub-regions, in one or more embodiments, an absolute capacitive scan is performed with a matrix electrode array of an entire sensing region of an input device. As such, the sub-regions determined in Step 320 above and Steps 420 and 480 below may be based on an absolute capacitive scan using an entire matrix electrode array in an input device.

Figure 4:
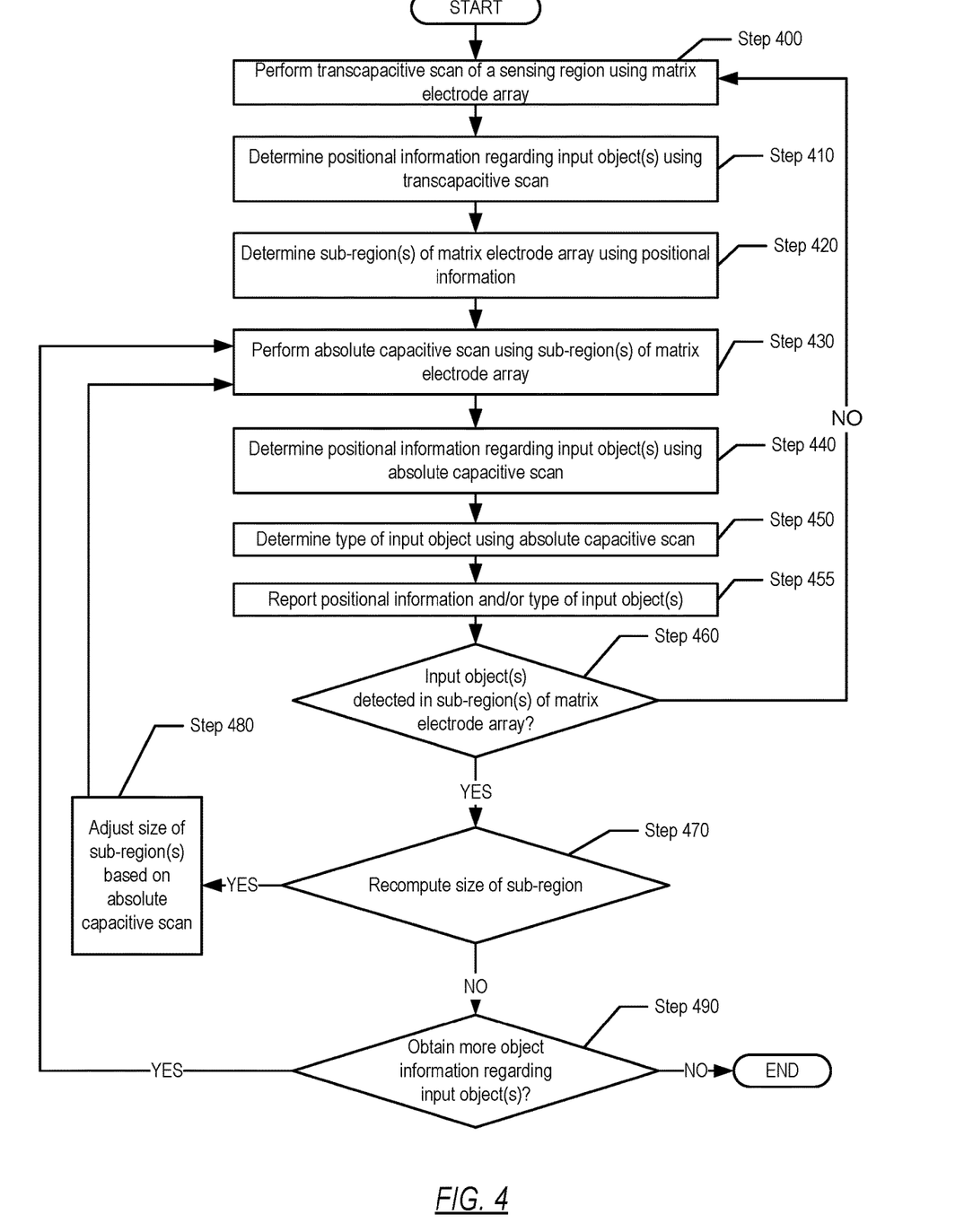
FIG. 4 shows a flowchart in accordance with one or more embodiments.

Turning to FIG. 4, FIG. 4 shows a flowchart in accordance with one or more embodiments. Specifically, FIG. 4 describes a method for performing capacitive sensing with sub-regions of an input device. The process shown in FIG. 4 may involve, for example, one or more components discussed above in reference to FIGS. 1 and 2 (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a transcapacitive scan of a sensing region is performed using a matrix electrode array in accordance with one or more embodiments. Specifically, a trans-capacitive sensing mode of an input device may detect whether an input object is located in a sensing region. The transcapacitive scan may provide a partial scan of the sensing region that coarsely tracks and classifies an input object. Step 400 may be similar to Step 300 described above in FIG. 3 and the accompanying description.

In Step 410, positional information regarding one or more input objects is determined using a transcapacitive scan in accordance with one or more embodiments. Step 410 may be similar to Step 310 described above in FIG. 3 and the accompanying description.

In Step 420, one or more sub-regions of a matrix electrode array are determined using positional information in accordance with one or more embodiments. Step 420 may be similar to Step 320 described above in FIG. 3 and the accompanying description.

In Step 430, an absolute capacitive scan is performed using one or more sub-regions of a matrix electrode array in accordance with one or more embodiments. Step 430 may be similar to Step 330 described above in FIG. 3 and the accompanying description.

In one or more embodiments, multiple sub-regions are determined from a matrix electrode array. For example, a processing system may select non-contiguous groups of sensor electrodes for different input objects in a sensing region. Likewise, depending on the changing type and/or location of multiple input objects, sub-regions may be combined into one sub-region. On the other hand, a sub-region may be further sub-divided into other sub-regions, such as where an input object moves outside of the previous sub-region.

In Step 440, positional information regarding one or more input objects is determined using an absolute capacitive scan in accordance with one or more embodiments. For example, an input device may track the location of an input object in a sensing region using an absolute capacitive scan performed by one or more sub-regions of a matrix electrode array. For example, with the absolute capacitive scan, the input device may determine whether an input object touches an input surface of the input device and/or whether the input object is hovering over the input surface. Likewise, a processing system may use the absolute capacitive scan to perform a detailed analysis of the location of the input object, such as the distance between the input surface and the closest point of the input object. Thus, the positional information in Step 440 may have greater precision than the positional information from Step 410 or Step 310 above.

In Step 450, a type of input object is determined using an absolute capacitive scan in accordance with one or more embodiments. Using a capacitive image obtained from an absolute capacitive scan, for example, the absolute capacitive measurements may identify whether an input object is a finger, glove, stylus, etc. In particular, a processing system may analyze absolute capacitive measurements to determine a shape of an input object. The processing system may compare a detected shape with pre-stored templates and/or perform various input object identification algorithms on the absolute capacitive measurements to determine the type of input object. Likewise, the intensity of the change in capacitance at one or more receiver electrodes may identify other object information regarding one or more input objects in the sensing region.

In Step 455, positional information and/or one or more types of one or more input objects is reported in accordance with one or more embodiments. For example, positional information and/or other object information may be reported to a host device, such as an electronic system coupled to an input device. On the host device, the positional information and/or the other object information may trigger one or more interface actions within a graphical user interface. For example, interface actions may include opening, moving, and/or closing graphical user interface windows.

In one or more embodiments, a processing system and/or the host device triggers a haptic event in response to the positional information and/or other object information. For example, the haptic event may be a physical response that resembles a vibration and/or physical resistance experienced by a user of an input device. Examples of haptic events may include ringing, vibrations, sounds, and/or other user sensations. In one or more embodiments, for example, the haptic event is configured to emulate a physical response produced using a tactile switch.

In another embodiment, a processing system may use the positional information and/or other object information to adjust one or more capacitive sensing characteristics on the input device. For example, a processing system may adjust noise correction algorithms, interference detection techniques, and/or capacitive sensing rates based on the type of input object detected in Step 450.

In Step 460, a determination is made whether one or more input objects are detected using one or more sub-regions of matrix electrode array in accordance with one or more embodiments. In one or more embodiments, a processing system may determine that one or more input objects associated with a sub-region have left the sub-region. For example, an input object may move to a different portion of the sensing region that may be analyzed by various sensor electrodes outside the present sub-region. Likewise, an input object may be located above an input surface at a distance such that the processing system designates the input object outside of a sensing region and no longer associated with the respective sub-region. When a determination is made that at least one input object is located in a portion of a sensing region measured by a sub-region, the process may proceed to Step 470. When a determination is made that no input object is located in a sensing region, the process may proceed to Step 410.

In Step 470, a determination is made whether to recompute a size of a sub-region in accordance with one or more embodiments. A processing system may analyze an absolute capacitive scan to determine whether a desired portion of an input object is located outside the scope of a sub-region. For example, if a processing system detects a particular change in capacitance at a receiver electrode on the perimeter of the sub-region, the processing system may determine that the input object extends beyond the sub-region. Accordingly, a processing system may analyze the absolute capacitive scan to determine whether information on the input object not detected by the sub-region is desired for further processing by the input device.

Likewise, the type of input object in Step 455 may provide a prediction on another desired portion of an input object that is located in the sensing region. For example, if a finger is detected, a processing system may extrapolate areas of the finger beyond the sub-region. If two fingers are detected by the sub-region, the sub-region may be expanded to encompass a larger capacitive image of both fingers. When a determination is made to recompute a sub-region, the process may proceed to Step 480. When a determination is made to maintain the current size of the sub-region, the process may proceed to Step 490.

In Step 480, a size of one or more sub-regions is adjusted based on absolute capacitive scan in accordance with one or more embodiments. For example, based on the positional information and/or type of input object, a processing system may recompute one or more sub-regions to produce an adjusted sub-region. In the adjusted sub-region, sensor electrodes may be added and/or excluded from the respective sub-region. For example, sensor electrodes may be added adjacent to receiver electrodes and/or transmitter electrodes at the edge of a sub-region. In one or more embodiments, sensor electrodes in a sub-region adjusted to conserve electric power for the input device. For example, if a user's palm is detected in Step 450 above, a processing system may remove sensor electrodes proximate the interior of the sub-region to reduce power consumption.

In Step 490, a determination is made whether to obtain more object information regarding one or more input objects in accordance with one or more embodiments. For example, an input device may stop input object proximity sensing while other processes, such as noise detection, are being performed by the input device. When a determination is made that more object information is desired regarding an input object, the process may proceed to Step 430. When a determination is made that no further object information is desired, the process may end.

Figure 5A:
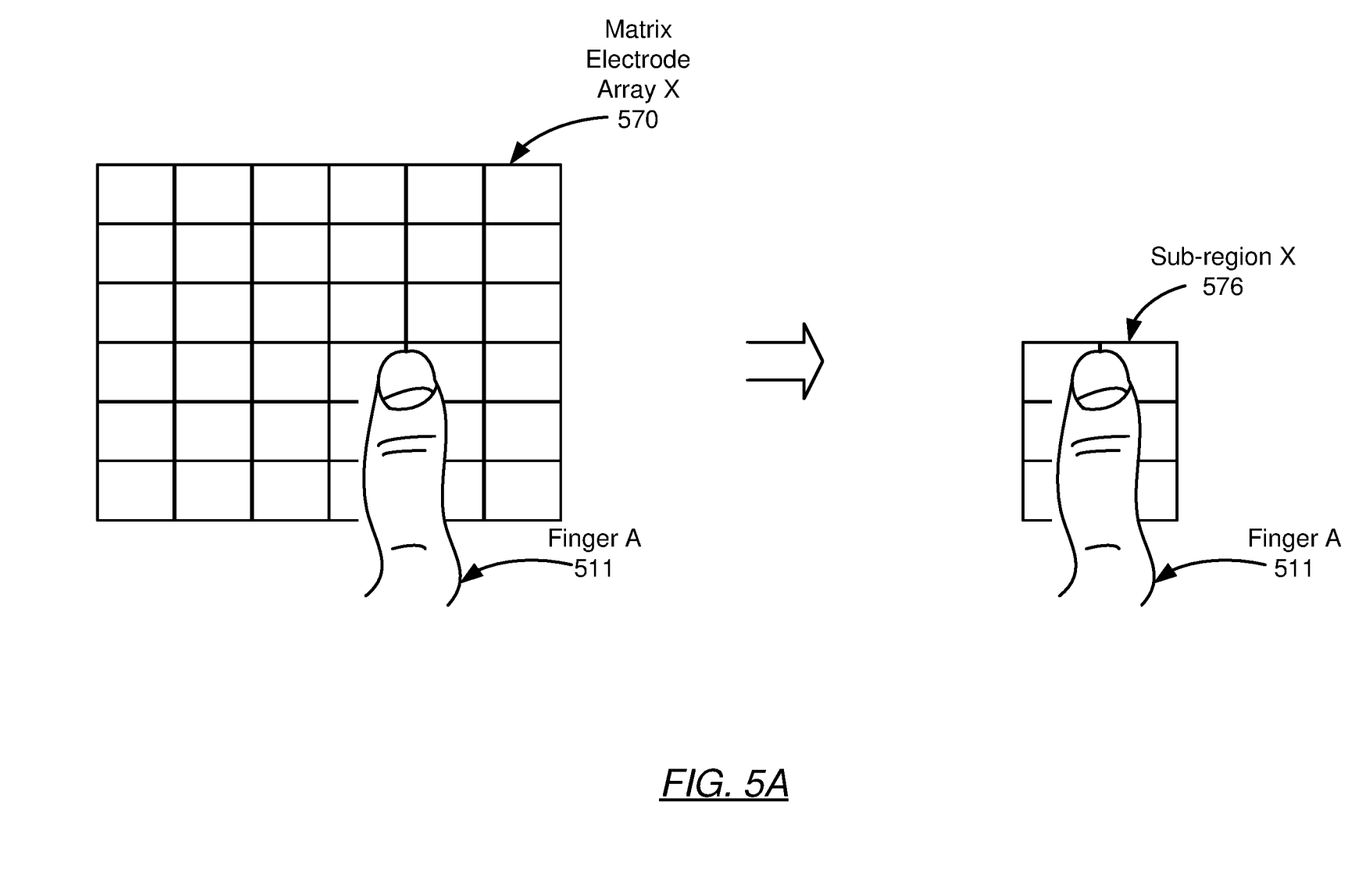
FIG. 5A shows an example in accordance with one or more embodiments.
Figure 5B:
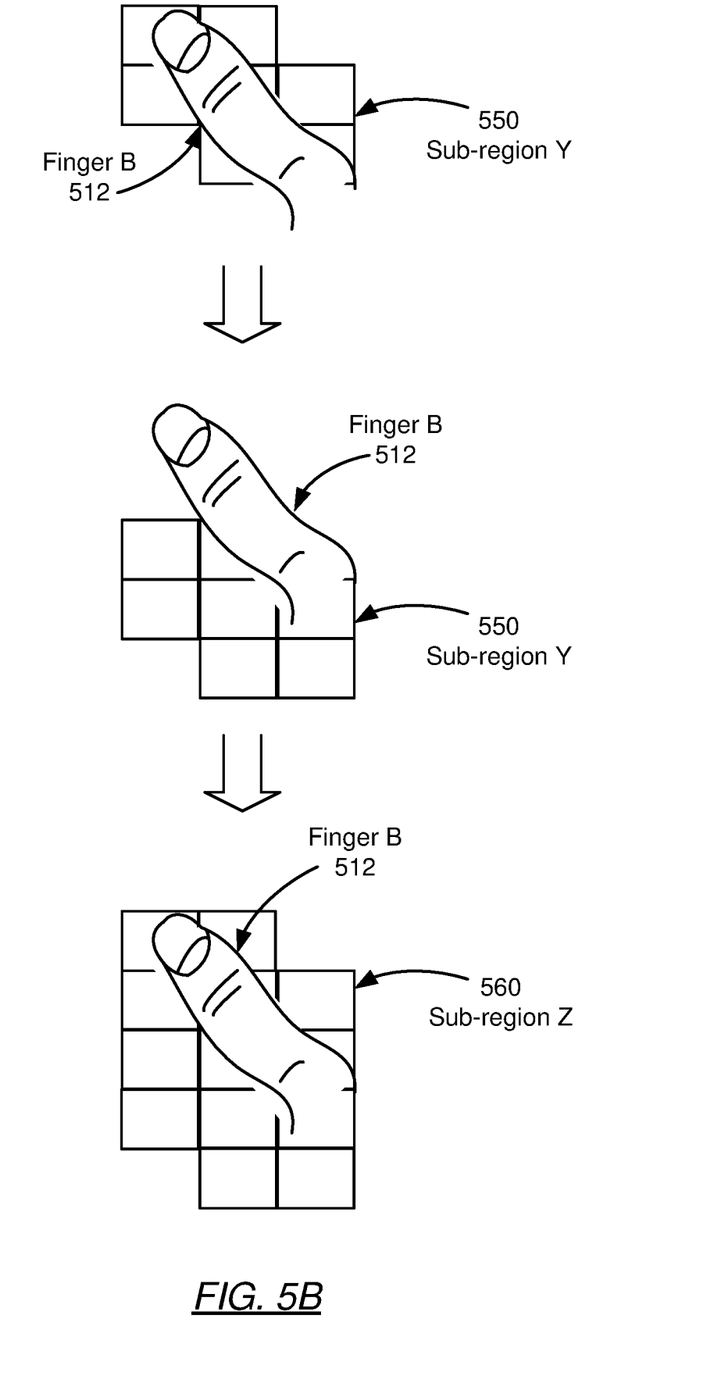
FIG. 5B shows an example in accordance with one or more embodiments.

Turning to FIGS. 5A and 5B, FIGS. 5A and 5B provide examples of capacitive sensing using sub-regions of a matrix electrode array. The following examples are for explanatory purposes only and are not intended to limit the scope of the disclosed technology.

Turning to FIG. 5A, a matrix electrode array X (570) is shown for an input device (not shown). Each square in the matrix electrode X (570) may represent one or more sensor electrodes. In particular, the input device uses the matrix electrode array X (570) to detect an input object with a transcapacitive scan of a sensing region. As such, a processing system (not shown) determines a sub-region X (576) of matrix electrode array X (570) based on positional information of the input object, i.e., finger A (511). Specifically, the processing system selects electrodes located physically below at a portion of the finger A (511) to form the sub-region X (576). Accordingly, the processing system then performs an absolute capacitive scan of the sub-region X (576) to determine that finger A (511) is a human finger and not a stylus, palm, or human face. The processing system also detects an outline of the finger for adjusting the size of sub-region X (576).

Turning to FIG. 5B, sub-region Y (550) of a matrix electrode array (570) is shown. Using the sub-region Y (550), a processing system performs an absolute capacitive scan to monitor finger B (512). The processing system detects that finger B (512) moves outside of the sub-region Y (550). Thus, the processing system adjusts the size of sub-region Y (550) to produce sub-region Z (560) that includes several additional sensor electrodes. The processing system may now perform an absolute capacitive scan with sub-region Z (560) that encompasses all of finger B (512) in a new location of the sensing region of an input device.

Figure 6:
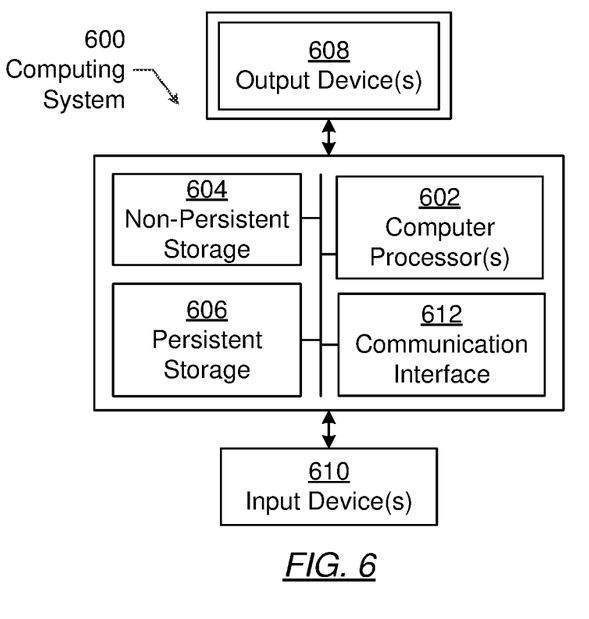
FIG. 6 shows a computing system in accordance with one or more embodiments.

Embodiments may be implemented on a computing system. Any combination of mobile, desktop, server, router, switch, embedded device, or other types of hardware may be used. For example, as shown in FIG. 6, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (600) in FIG. 6. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6, while performing one or more embodiments of the disclosed technology, may perform data comparison. Data comparison may be used to compare two or more data values (e.g., A, B). For example, one or more embodiments may determine whether $A>B$, $A=B$, $A\,!=B$, $A<B$, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if $A>B$, B may be subtracted from A (i.e., $A-B$), and the status flags may be read to determine if the result is positive (i.e., if $A>B$, then $A-B>0$). In one or more embodiments, B may be considered a threshold, and A is deemed to satisfy the threshold if $A=B$ or if $A>B$, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (600) in FIG. 6 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system (600) of FIG. 6 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 6. Other functions may be performed using one or more embodiments of the disclosed technology.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:

1. A processing system, comprising:
   a sensor module, the sensor module configured to:
      perform, using a matrix electrode array, a first transcapacitive scan to detect a first input object in a sensing region of an input device,
      perform a first absolute capacitive scan within a first sub-region of the matrix electrode array after performing the first transcapacitive scan, and
      perform a second absolute capacitive scan within the first sub-region of the matrix electrode after performing the first absolute capacitive scan; and
   a determination module, the determination module configured to:
      determine, using the first transcapacitive scan, positional information regarding the first input object in the sensing region,
      determine, based on the positional information from the first transcapacitive scan, the first sub-region of the matrix electrode array in which the first input object is located,
      determine, using the first absolute capacitive scan, object information regarding a location of the first input object in the sensing region; and
      monitor, using the object information, the first input object in the sensing region without performing transcapacitive scanning by:
         determining, using the second absolute capacitive scan within the first sub-region of the matrix electrode array, that a portion of the input object is located outside a portion of the sensing region corresponding to the first sub-region of the matrix electrode array, and
         adjusting, in response to determining the portion of the input object is located outside, the first sub-region of the matrix electrode array to produce an adjusted sub-region of the matrix electrode array,
      wherein the sensor module is further configured to perform a third absolute capacitive scan within the adjusted sub-region of the matrix electrode array without performing the transcapacitive scanning.

2. The processing system of claim 1, wherein the determination module is further configured to:
   report the object information to a host device, wherein the host device is configured to perform an interface action within a graphical user interface based at least in part on the object information.

3. The processing system of claim 1,
   wherein the matrix electrode array comprises a plurality of transmitter electrodes and a plurality of receiver electrodes,
   wherein the plurality of transmitter electrodes and the plurality of receiver electrodes alternate in a row of the matrix electrode array to produce a checkerboard pattern of electrodes.

4. The processing system of claim 1,
   wherein the matrix electrode array comprises a first subset of transmitter electrodes and a second subset of transmitter electrodes,
   wherein the first sub-region of the matrix electrodes array corresponds to the first subset of the transmitter electrodes, and
   wherein the absolute capacitive scan is performed by transmitting a plurality of transmitter signals over the first subset of the transmitter electrodes and not the second subset of the transmitter electrodes.

5. The processing system of claim 1,
   wherein the determination module is further configured to:
      determine, using the third absolute capacitive scan within the adjusted sub-region of the matrix electrode array, that no input object is located in a portion of the sensing region corresponding to the adjusted sub-region of the matrix electrode array; and
   wherein the sensor module is further configured to:
      perform a second transcapacitive scan of the sensing region of the input device in response to determining that no input object is located in the portion of the sensing region corresponding to the adjusted sub-region of the input device.

6. The processing system of claim 1,
wherein the adjusted sub-region comprises more electrodes than the first sub-region of the matrix electrode array.

7. The processing system of claim 1,
wherein the determination module is further configured to determine, using the object information from the first absolute capacitive scan, a type of input object corresponding to the first input object detected in the sensing region of the input device, and
wherein the type of input object is selected from a group comprising a finger, a stylus, a glove, a face of a user, or a palm of the user.

8. The processing system of claim 1,
wherein the first transcapacitive scan detects the first input object and a second input object in the sensing region of the input device,
wherein the determination module is further configured to determine, using the first transcapacitive scan, a second sub-region of the matrix electrode array corresponding to the second input object, and
wherein the first sub-region of the matrix electrode array comprises a plurality of electrodes that are separate from a plurality of electrodes in the second sub-region of the matrix electrode array.

9. An input device, comprising:
a matrix electrode array; and
a processing system operatively connected to the matrix electrode array, the processing system configured to:
  perform, using the matrix electrode array, a first transcapacitive scan to detect a first input object in a sensing region of the input device,
  determine, using the first transcapacitive scan, positional information regarding the first input object in the sensing region,
  determine, based on the positional information from the first transcapacitive scan, a first sub-region of the matrix electrode array in which the first input object located,
  perform a first absolute capacitive scan within the first sub-region of the matrix electrode array,
  determine, using the first absolute capacitive scan, object information regarding a location of the first input object in the sensing region; and
  monitor, using the object information, the first input object in the sensing region without performing transcapacitive scanning by:
    determining, using a second absolute capacitive scan within the first sub-region of the matrix electrode array, that a portion of the input object is located outside a portion of the sensing region corresponding to the first sub-region of the matrix electrode array,
    adjusting, in response to determining the portion of the input object is located outside, the first sub-region of the matrix electrode array to produce an adjusted sub-region of the matrix electrode array, and
    performing a third absolute capacitive scan within the adjusted sub-region of the matrix electrode array.

10. The input device of claim 9, wherein the processing system is further configured to:
report the object information to a host device, wherein the host device is configured to perform an interface action within a graphical user interface based at least in part on the object information.

11. The input device of claim 9, wherein the processing system is further configured to:
determine, using the first transcapacitive scan, a second sub-region of the matrix electrode array corresponding to a second input object in the sensing region of the input device,
wherein the first transcapacitive scan detects the first input object and the second input object, and
wherein the first sub-region of the matrix electrode array comprises a plurality of electrodes that are separate from a plurality of electrodes in the second sub-region of the matrix electrode array.

12. The input device of claim 9, wherein the processing system is further configured to:
determine, using the third absolute capacitive scan within the adjusted sub-region of the matrix electrode array, that no input object is located in a portion of the sensing region corresponding to the adjusted sub-region of the matrix electrode array, and
perform a second transcapacitive scan of the sensing region of the input device in response to determining that no input object is located in the portion of the sensing region corresponding to the adjusted sub-region of the input device.

13. The input device of claim 9, wherein the processing system is further configured to:
wherein the adjusted sub-region comprises more electrodes than the first sub-region of the matrix electrode array.

14. The input device of claim 9,
wherein the matrix electrode array comprises a plurality of transmitter electrodes and a plurality of receiver electrodes, and
wherein the plurality of transmitter electrodes and the plurality of receiver electrodes alternate in a row of the matrix electrode array to produce a checkerboard pattern of electrodes.

15. A method of capacitive sensing, comprising:
performing, using the matrix electrode array, a first transcapacitive scan to detect a first input object in a sensing region of the input device;
determining, using the first transcapacitive scan, positional information regarding the first input object in the sensing region;
determining, using the positional information from the first transcapacitive scan, a first sub-region of the matrix electrode array in which the first input object is located;
performing a first absolute capacitive scan within the first sub-region of the matrix electrode array;
determining, using the first absolute capacitive scan, object information regarding a location of the first input object in the sensing region;
performing a second absolute capacitive scan within the first sub-region of the matrix electrode after performing the first absolute capacitive scan; and
monitoring, using the object information, the first input object in the sensing region without performing transcapacitive scanning by:
  determining, using a second absolute capacitive scan within the first sub-region of the matrix electrode array, that a portion of the input object is located outside a portion of the sensing region corresponding to the first sub-region of the matrix electrode array, adjusting, in response to determining the portion of the input object is located outside, the first sub-region of the matrix electrode array to produce an adjusted sub-region of the matrix electrode array, and performing a third absolute capacitive scan within the adjusted sub-region of the matrix electrode array.

16. The method of claim 15, further comprising:

report the object information to a host device, wherein the host device is configured to perform an interface action within a graphical user interface based at least in part on the object information.

17. The method of claim 15, further comprising:

determining, using the third absolute capacitive scan within the adjusted sub-region of the matrix electrode array, that no input object is located in a portion of the sensing region corresponding to the adjusted sub-region of the matrix electrode array; and performing a second transcapacitive scan of the sensing region of the input device in response to determining that no input object is located in the portion of the sensing region corresponding to the adjusted sub-region of the input device.

18. The method of claim 15, further comprising:

determining, using the first transcapacitive scan, a second sub-region of the matrix electrode array corresponding to a second input object in the sensing region of the input device, wherein the first transcapacitive scan detects the first input object and the second input object, and wherein the first sub-region of the matrix electrode array comprises a plurality of electrodes that are separate from a plurality of electrodes in the second sub-region of the matrix electrode array.

19. The processing system of claim 1, wherein:

the positional information corresponds to a center of the first input object, and determining the first sub-region comprises comparing the center within a plurality of pre-stored sub-region templates.

20. The method of claim 15, wherein:

the positional information corresponds to a center of the first input object, and determining the first sub-region comprises comparing the center within a plurality of pre-stored sub-region templates.

* * * * *